(12) United States Patent
Yonezawa et al.

(10) Patent No.: US 6,983,419 B1
(45) Date of Patent: Jan. 3, 2006

(54) COMMUNICATION APPARATUS, ITS CONTROL METHOD, AND STORAGE MEDIUM

(75) Inventors: Hiroki Yonezawa, Yokohama (JP); Koichiro Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 09/619,876

(22) Filed: Jul. 20, 2000

(30) Foreign Application Priority Data

Jul. 23, 1999 (JP) ................................. 11-209013
Jun. 27, 2000 (JP) ............................. 2000-192777

(51) Int. Cl.
*G11B 27/00* (2006.01)

(52) U.S. Cl. ..................... 715/722; 715/718; 715/778

(58) Field of Classification Search ............... 345/629, 345/154, 423, 418, 419, 636, 643, 649, 650, 345/660, 661, 667, 671, 677, 700, 723, 764, 345/765, 777, 800, 801, 815, 835, 837; 348/154, 348/39, 588, 584, 156; 715/719, 720, 718, 715/763, 764, 835, 846, 722, 778
See application file for complete search history.

(56) References Cited

U.S. PATENT DOCUMENTS

| | | | | |
|---|---|---|---|---|
| 4,745,479 | A | * | 5/1988 | Waehner .................... 348/588 |
| 4,970,666 | A | * | 11/1990 | Welsh et al. ................ 345/423 |
| 5,509,009 | A | * | 4/1996 | Laycock et al. ............ 370/259 |
| 5,625,410 | A | * | 4/1997 | Washino et al. ............ 348/154 |
| 5,650,814 | A | * | 7/1997 | Florent et al. ................ 348/39 |
| 5,657,096 | A | * | 8/1997 | Lukacs ........................ 348/585 |
| 5,706,457 | A | * | 1/1998 | Dwyer et al. ............... 345/835 |
| 5,729,471 | A | * | 3/1998 | Jain et al. .................... 345/419 |
| 6,069,655 | A | * | 5/2000 | Seeley et al. ............... 348/154 |
| 6,229,522 | B1 | * | 5/2001 | Reid .......................... 345/643 |
| 6,317,141 | B1 | * | 11/2001 | Pavley et al. ............... 345/732 |
| 6,452,612 | B1 | * | 9/2002 | Holtz et al. ................ 345/723 |
| 6,665,004 | B1 | * | 12/2003 | Paff ........................... 348/156 |
| 2001/0013865 | A1 | * | 8/2001 | Kamei ........................ 345/418 |

OTHER PUBLICATIONS

A K Benkhalil et al., Real-time Detection and Tracking of a Moving Object Using a Complex Programmable Logic Device, 1998, IEEE, pp. 10/1-10/7.*

Ali K. Benkhalil et al., A novel CPLD implementation of a motion detection algorithm for surveillance applications, 1998, IEEE, pp. 105-108.*

Frankel et al., Design, Implementation, and Performance of a Scalable Multi-Camera Interactive Video Capture System, 1995, IEEE, pp. 132-137.*

Nishimura et al., Real-time Camera Control for Videoconferencing over the Internet, 1998, IEEE, pp. 1-4.*

* cited by examiner

*Primary Examiner*—Weilun Lo
*Assistant Examiner*—Truc T Chuong
(74) *Attorney, Agent, or Firm*—Morgan & Finnegan, LLP

(57) ABSTRACT

A communication apparatus which receives image data taken by an imaging apparatus connected through a network, comprises a storage for storing control information to control the imaging apparatus, and an output for outputting to a display unit a synthetic image which is obtained by synthesizing a symbol representing a state of the imaging apparatus to image information indicating a setting location of the imaging apparatus in accordance with the control information stored in storage. Accordingly, a stored state of the imaging apparatus can be easily grasped.

12 Claims, 11 Drawing Sheets

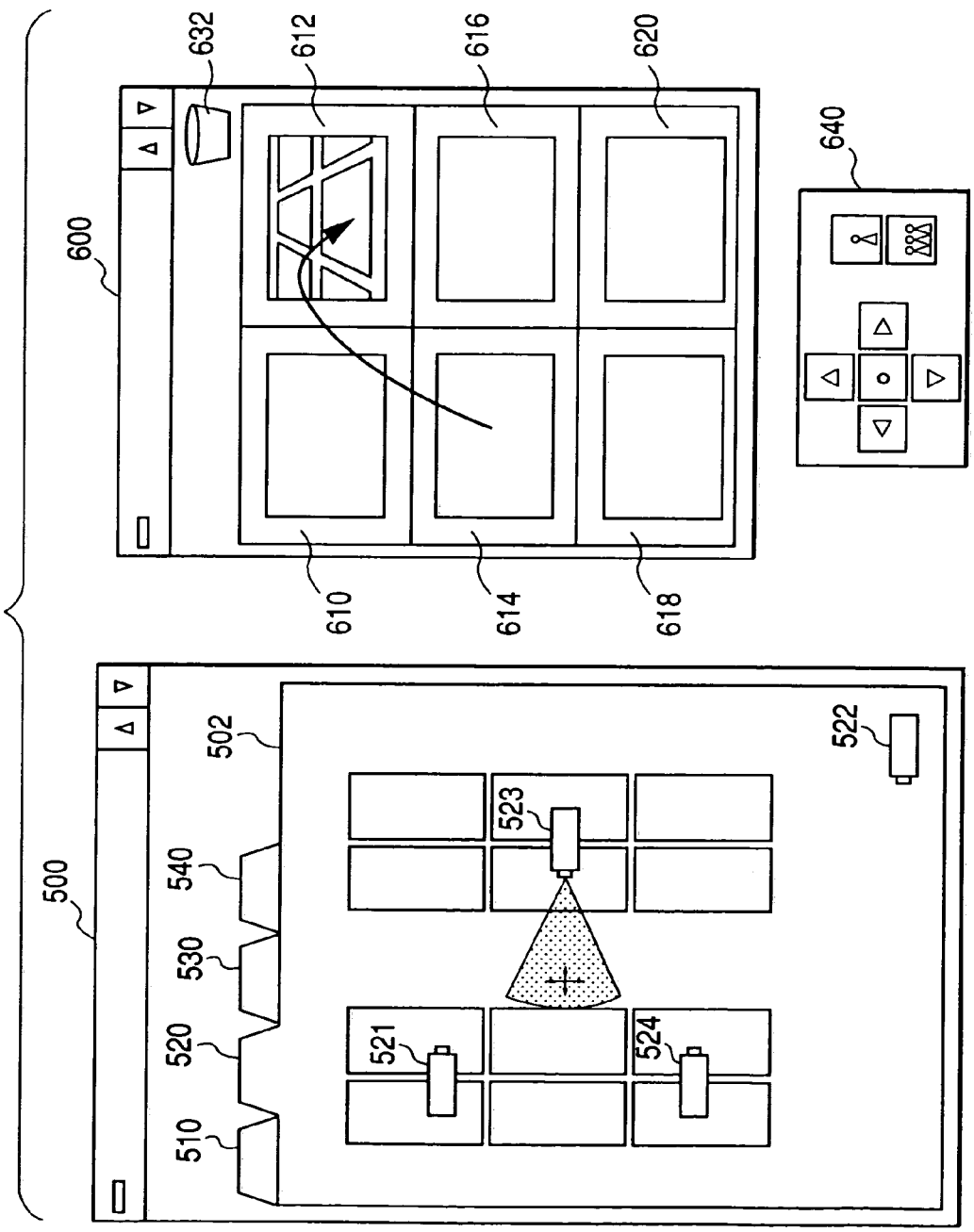

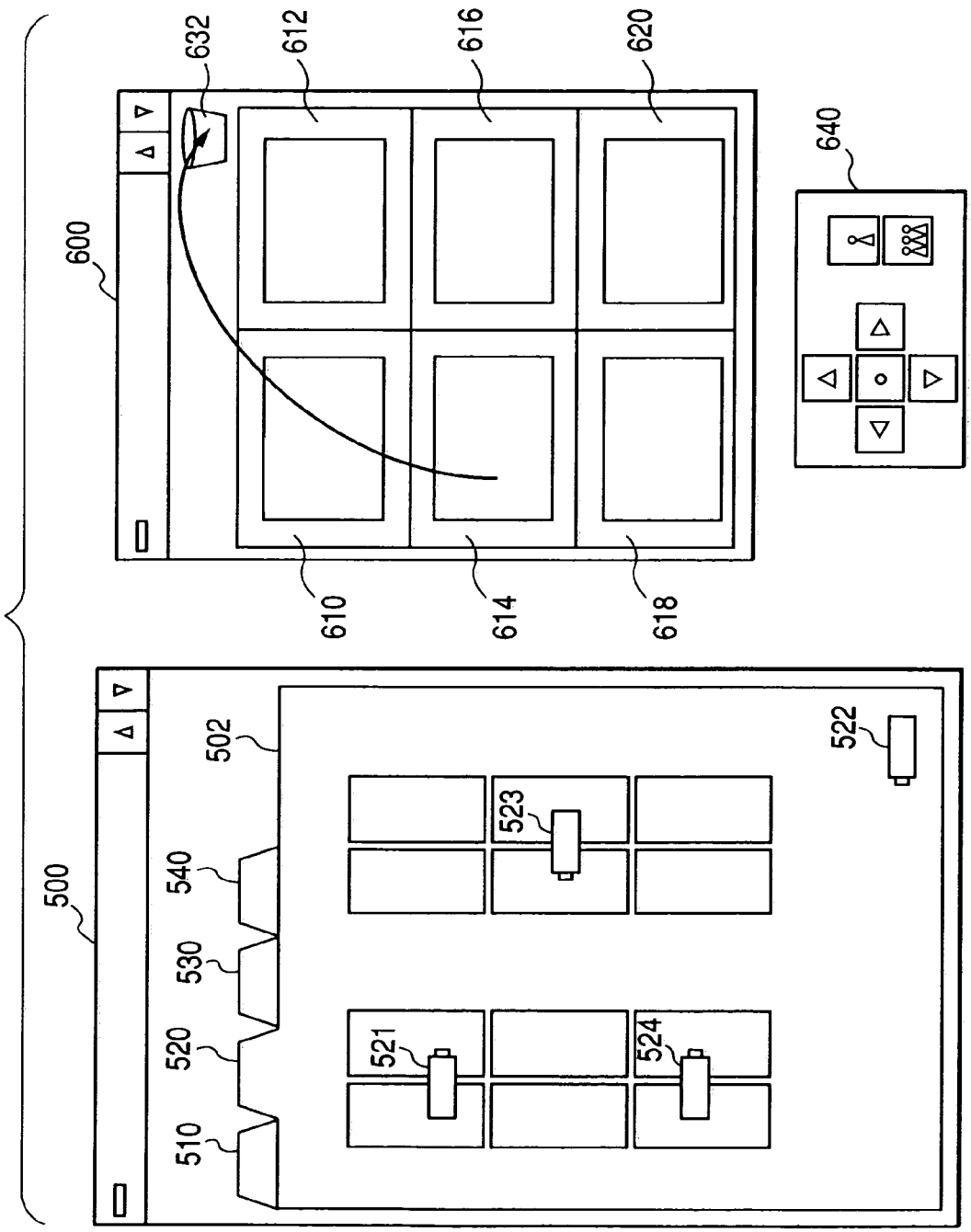

COMMUNICATION APPARATUS, ITS CONTROL METHOD, AND STORAGE MEDIUM

BACKGROUND OF THE INVENTION

1. Field of the Invention

The present invention relates to a communication apparatus which receives and displays image data and the like sent from, e.g., a communication apparatus at a remote location connected through a communication network, a control method for the communication apparatus, and a storage medium.

2. Related Background Art

One video transmission system has been proposed. In this system, for example, plural video cameras and computers are located inside a building, and these video cameras and the computers are networked through communication lines, thereby realizing video transmission among plural desired points and interactive communication by video and audio.

In such the video transmission system, a user of the computer at one point can remote-control the video camera at the desired point and display the video taken by the remote-controlled video camera on the screen of own computer.

Further, in the video transmission system capable of remote-controlling the video camera, especially, as the number of the video cameras to be remote-controlled increases, it is necessary for the user to easily understand where each video camera is located. Thus, the technique which superimposes a camera symbol representing the location of each video camera on an image representing a map has been proposed. Further, the technique which represents the direction of the actual video camera by displaying the direction of the camera symbol has been proposed.

Further, a method of controlling the video camera by transferring a camera control parameter stored as preset (control) information to the video camera has been proposed.

In the above system, the user can quickly and precisely control the video camera to a desired object by using the preset (control) information, and a necessary video can be obtained.

However, in a conventional system, the preset (control) information is managed on a user interface as sequential number or a title of an object or scenery to be displayed (for example, "Reception" or "front of Elevator"). That is, there was a problem that relationship between each of two preset information (i.e., imaging direction change of a sequential number 1 and a sequential number 2) had not been intuitively known.

Further, the preset information is applied to the video camera by selecting the sequential number or the title on the user interface using a mouse or a keyboard. That is, when an operator wants to control the video camera mainly referring to the map, since cursor movement (shift) by the mouse was frequently required, a complex operation has been brought.

SUMMARY OF THE INVENTION

An object of the present invention is to solve the above problem and realize that an operator can easily grasp the state change of an imaging apparatus, to which stored control information is applied, on a map.

Another object of the present invention is to provide a means for applying the stored control information to the imaging apparatus using the map and realize to operate the imaging apparatus mainly referring to the map.

In order to solve the above problem, the present invention provides a communication apparatus which receives image data imaged (taken) by the imaging apparatus connected through a network, comprises a storage means (store preset information) for storing control information to control the imaging apparatus, an output means (display a camera icon) for outputting to a display unit a synthetic image which is obtained by synthesizing a symbol representing a state of the imaging apparatus to image information indicating a setting location of the imaging apparatus in accordance with the control information stored in the storage means, and an output means (display a preset symbol) for outputting to the display unit a synthetic image which is obtained by synthesizing a symbol corresponding to the control information stored in the storage means to the image information. The communication apparatus further comprises a means (shift (move) a preset symbol) for determining a synthesizing position when the symbol corresponding to the control information is synthesized to the image information, and a control means (control a video camera by clicking a preset symbol) for controlling the control information to control the imaging apparatus is to be applied to the imaging apparatus by an operation to the symbol which corresponds to the control information.

Still another object of the present invention is to provide a new function.

Other features of the present invention will become apparent from the following embodiments and the attached drawings.

BRIEF DESCRIPTION OF THE DRAWINGS

FIG. 8 is a view showing the state when a display area by the drag-and-drop operation is changed, according to one embodiment of the present invention;

FIG. 10 is a view showing the state of an operation to stop the display by the drag-and-drop operation according to one embodiment of the present invention;

DETAILED DESCRIPTION OF THE PREFERRED EMBODIMENTS

Hereinafter, embodiments of a video communication system according to the present invention will be described in detail with reference to the attached drawings.

Figure 1:
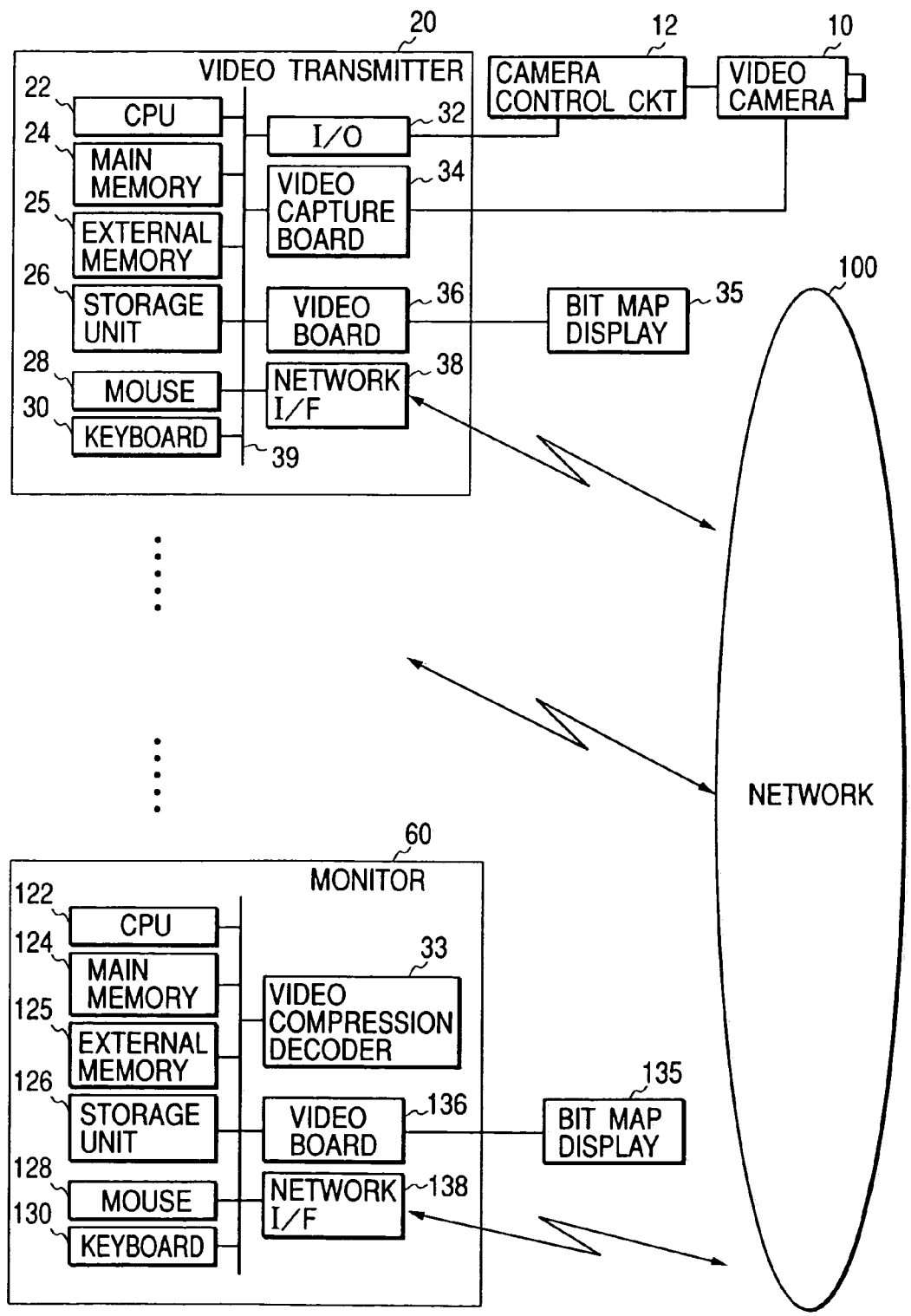
FIG. 1 is a block diagram showing the entire structure of a communication system including a video communication system according to one embodiment of the present invention.

FIG. 1 is a block diagram showing the entire structure of a communication system including a video communication system according to one embodiment of the present invention.

In FIG. 1, numeral 10 denotes a video camera which generates video (or an image signal) on the basis of a taken image. Numeral 20 denotes a video transmitter such as a work station (WS), a personal computer (PC) or the like which transmits the image signal from the video camera 10 to a monitor 60 and receives a control signal from the monitor 60 to control the video camera 10. Numeral 60 denotes the monitor such as the WS, the PC or the like which receives the image signal from the video transmitter 20 and transmits the control signal to the video transmitter 20 to control the video camera 10.

The plural video transmitters 20 and the plural monitors 60 can communicate with others through a network 100. Preferably, the video transmitter 20 analog-to-digital (A/D) converts the image signal from the video camera 10 into digital image data, compresses the obtained digital image data, and transmits the compressed data to the monitor 60 through the network 100.

Numeral 12 denotes a camera control circuit which controls panning, tilting, zooming, focusing and irising operations in accordance with the control signal (i.e., a control code) from the video transmitter 20. The control signal is input from an input/output interface (I/O) 32 of the video transmitter 20 to the camera control circuit 12 on the basis of standards such as an RS-232C USB (Recommended Standard 232C for Universal Serial Bus), an IEEE (Institute of Electrical and Electronic Engineers) 1394 standard, and the like.

If the video camera 10 does not perform the panning, tilting, zooming, focusing and irising operations, the camera control circuit 12 is not always necessary. However, it is preferable to control ON/OFF of the power supply of the video camera 10.

(Video Transmitter 20)

Next, the structure of the video transmitter 20 will be explained. Numeral 24 denotes a main memory, and numeral 26 denotes a storage unit such as a hard disk or the like. Numeral 28 denotes a mouse which acts as a pointing device. However, other devices such as a touch panel on a bit map display 35 and the like may be also used. Numeral 30 denotes a keyboard which acts as input means. Numeral 25 denotes an external memory from which a storage medium such as a floppy disk, a CD-ROM, an MO or the like is detachable. Numeral 32 denotes the I/O which is connected to the camera control circuit 12 to transmit and receive the control signal of the video camera 10. Numeral 34 denotes a video capture board which captures a video output signal VD of the video camera 10. The video output signal VD may be an analog signal such as a general NTSC (National Television System committee) signal or a digital signal. If the signal VD is the analog signal, it is necessary for the video capture board 34 to have an A/D conversion function. Numeral 36 denotes a video board which obtains the video captured by the video capture board 34 through a system bus 39 and displays the obtained video at an arbitrary location on the bit map display 35. Numeral 38 denotes a network interface (I/F) which communicates with the monitor 60 through the network 100. The above units are connected to others through the system bus 39, and a CPU 22 controls the video transmitter 20 as a whole and the display of the bit map display 35 in accordance with software stored in the storage medium or the storage unit 26 or software obtained through the network 100.

If the video capture board 34 does not have a data compression function, it is possible to provide software for realizing such the function, whereby the CPU 22 can perform data compression processing.

By such the video transmitter 20 as structured above, the image data taken by the video camera 10 is transmitted to the monitor 60 at a remote location through the network 100, and the video camera 10 is controlled according to the control code received from the monitor 60. It should be noted that there are the plural video transmitters 20 and the plural monitors 60, and the video of the desired video transmitter can be received from any of the monitors.

(Monitor 60)

Next, the structure of the monitor 60 will be explained. It should be noted that, in the monitor 60, explanation of the devices or the units same as those in the video transmitter 20 will be omitted. A network I/F 138 receives the compressed image data from the video transmitter 20. A CPU 122 decompresses the received data (i.e., encoded data) by using a video compression decoder 33, and controls a video board 136 on the basis of the decompressed image data to cause a bit map display 135 to display the image taken by the video camera 10 and the state of the video camera 10. Further, the CPU 122 transmits the control code to the video transmitter 20 for controlling the video camera 10, in accordance with data input by the user of the monitor 60 with use of a keyboard 130 or a mouse 128.

Next, the software of the video transmitter 20 and the monitor 60 according to the present embodiment will be explained. It should be noted that the software explained hereinafter is executed by the hardware of the video transmitter 20 or the monitor 60.

Figure 2:
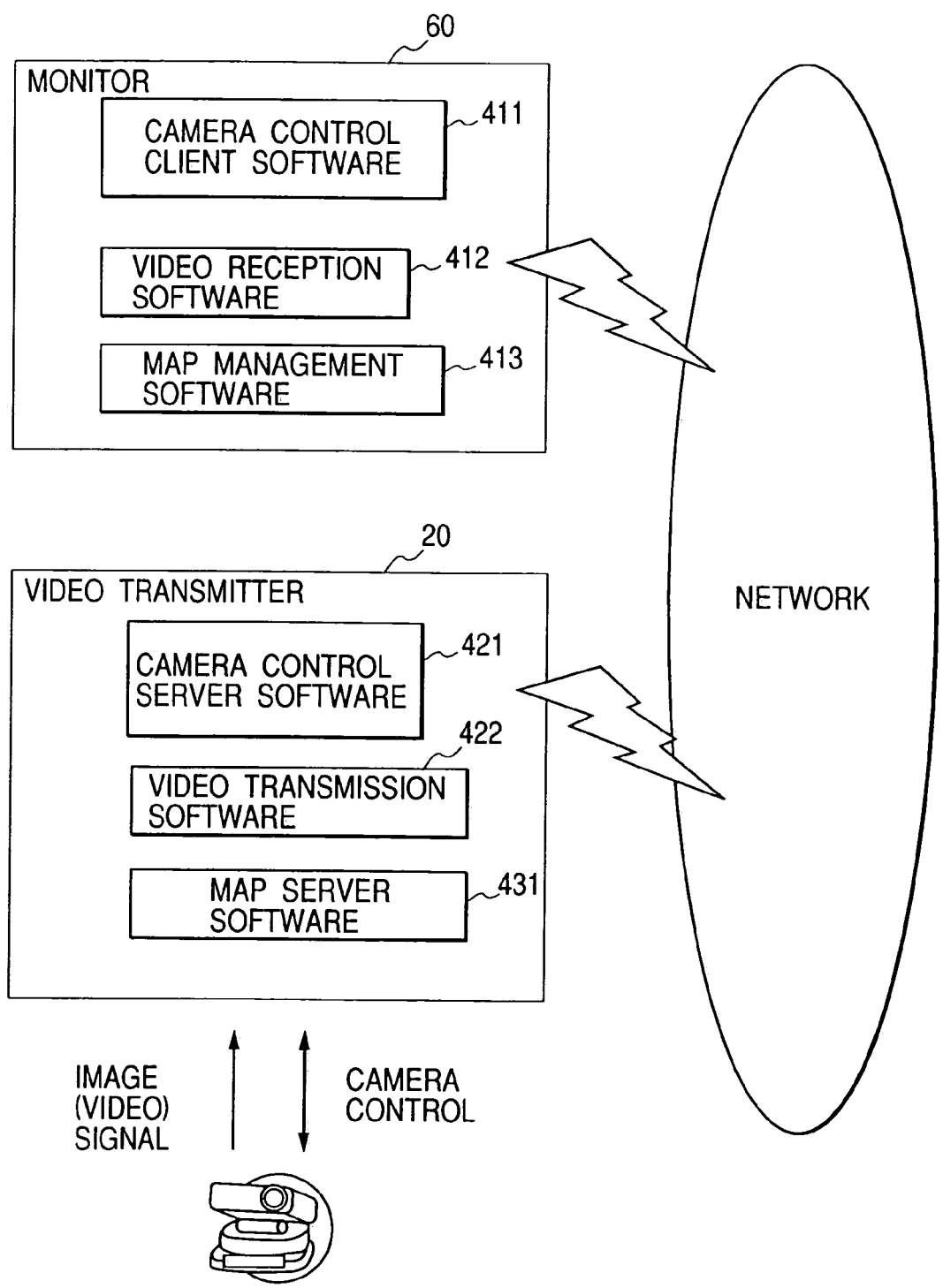
FIG. 2 is a block diagram showing the structure of main software of a video transmitter 20 and a monitor 60 according to one embodiment of the present invention.

FIG. 2 is a block diagram showing the structure of the main software of the video transmitter 20 and the monitor 60 according to one embodiment of the present invention.

First, the software to be executed by the monitor 60 will be explained. Numeral 411 denotes camera control client software which is to remote control the video camera 10 connected to the video transmitter 20. Numeral 412 denotes video reception software which is to decompress the compressed image data transmitted from the video transmitter 20 in the form of packet and display the decompressed image data. Further, the video reception software 412 is to manage image data received from all the video transmitters 20 (i.e., the video cameras 10) connected to the network 100. By the video reception software 412, a camera ID of each video camera, a host computer ID of the video transmitter 20 to which the video camera concerned is connected, the information concerning the camera operation states such as the panning, tilting, zooming, focusing and irising operations, the information concerning whether or not the video camera concerned is controllable, the state information concerning which video camera is currently controlled, and the state information concerning which video camera is currently displayed are stored into the monitor 60. Also the camera control client software 411 and map management software 413 share such the information, whereby the information is utilized to camera symbol change or the like. Numeral 413 denotes the map management software which uses a GUI (graphical user interface) function. The GUI function is to graphically display the location, the panning state and the tilting state of the video camera 10 and control the operation of the camera 10, by a map, the camera symbol and later-described scope display of FIG. 6. The above software is prestored into the storage unit of the monitor 60.

Next, the software to be executed by the video transmitter 20 will be explained. Numeral 421 denotes camera control server software which is to control the panning, tilting, zooming, focusing and irising operations of the video camera 10 connected to the video transmitter 20 and also capture the image data output from the video camera 10 to the video transmitter 20. Numeral 422 denotes video transmission software which cooperates with the camera control server software 421 and is to transmit the video to the monitor 60 currently controlling the video camera 10. Numeral 423 denotes map server software. The above software are prestored into the storage unit 26 of the video transmitter 20.

It is needless to say that, in addition to the above software, software for controlling two-way communication through the network 100, software for controlling the storage units 26 and 126, software for controlling the external memories 25 and 125, and the like are prepared in the system.

(User Interface)

Next, the user interface in the present embodiment, i.e., a screen which is displayed on the bit map display 135, will be explained. To simplify the explanation, the user interface will be explained on the premise that one monitor 60 is connected to the video transmitter 20 through the network.

Figure 3:
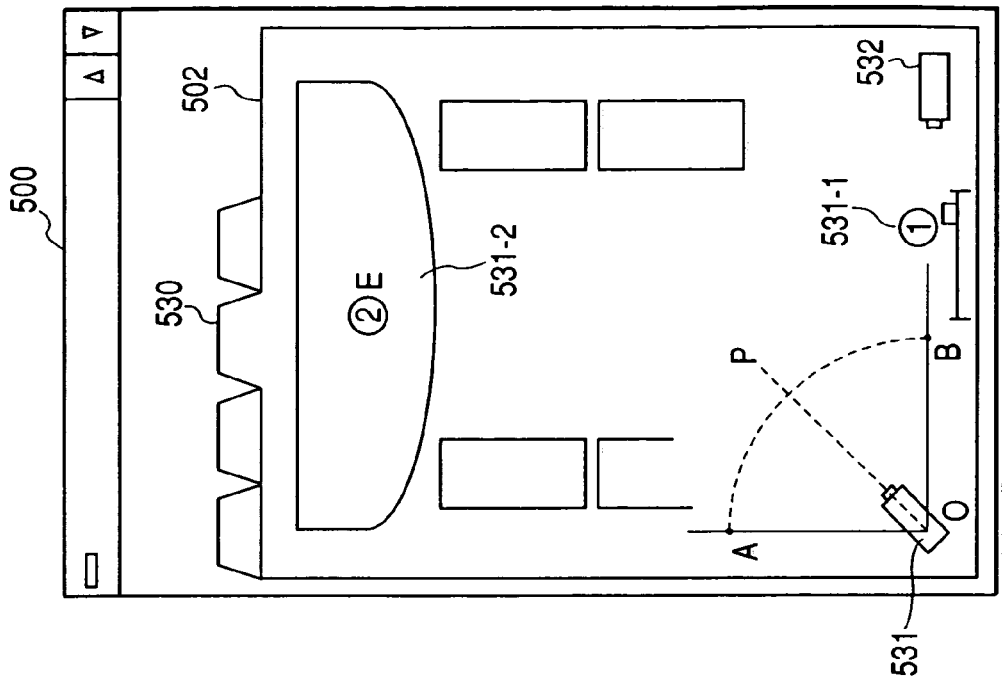
FIG. 3 is a view showing a display example of the monitor according to one embodiment of the present invention.
Figure 4:
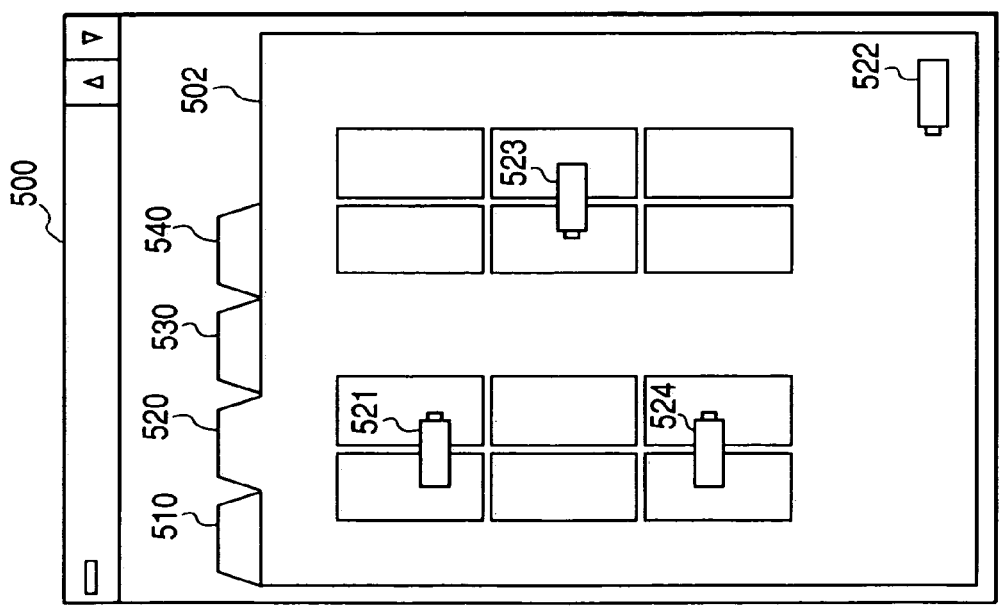
FIG. 4 is a view showing a display example of the monitor according to one embodiment of the present invention.

FIGS. 3 and 4 are views showing a display example of the monitor according to one embodiment of the present invention. Concretely, FIGS. 3 and 4 show one example of the screen displayed on the bit map display 135 of the monitor 60. In FIG. 3, numeral 500 denotes a map window in which the map is displayed. In the present embodiment, plural maps 510, 520, 530 and 540 showing layouts of offices, establishments (or stores), warehouses and the like are managed within the map window 500. Since each map is added with a map tab, if the map tab is clicked by the mouse 128, the map added with the clicked tab is displayed up-front (as a map display area 502). At this time, the camera symbols are displayed on the up-front map.

FIG. 3 shows the state that the map 520 is selected from among the maps 510 to 540 and displayed on the map display area 502. On the map 520, video camera symbols (or video camera icons) 521, 522, 523 and 524 are displayed as icons. At this time, if the map tab of the map 530 is clicked, the map 530 is displayed as shown in FIG. 4.

In FIG. 4, the map 530 is displayed on the map display area 502, and video camera symbols (or video camera icons) 531 and 532 are displayed on the map 530.

Figure 11:
FIG. 11 is a view showing a bit map of a camera symbol according to one embodiment of the present invention.

When the camera symbol is synthetically displayed on the map, if preset information for the camera symbol is stored into the storage unit of the monitor 60, a preset symbol is simultaneously displayed. Preset symbols 531-1 and 531-2 shown in FIG. 4 are the preset symbols of the camera symbol 531 and respectively represent a door and a stage. In the present embodiment, the preset symbol is represented by a circle bit map to which a serial number 1101 is annexed as shown in FIG. 11.

Of course, the preset symbol is not limited to the above example but may be another preferable one such as a character symbol if the symbol can be corresponded to the preset information.

In FIG. 4, reference mark 0 indicates a center point of the camera symbol 531, and a sector area AOB is formed by reference marks A, B and 0 as shown in FIG. 4.

A dotted line OP indicates an initial direction of the camera symbol 531. A radius OA indicates left edge direction controllable for the camera symbol 531. A radius OB indicates right edge direction controllable for the camera symbol 531.

The preset symbol is synthetically displayed on an arbitrarily designated position when an operator sets the preset information.

For example, the preset symbol 531-1 is positioned on an image side of indicating the door and the preset symbol 531-2 is positioned on an image side of indicating the stage.

When the preset information corresponding to each preset symbol is applied to an imaging apparatus, it is set that video near the door and video of the stage are respectively displayed.

Of course, since the preset symbol is arbitrarily positioned, the operator can put the preset symbol on a desired position for a use of it.

Figure 5:
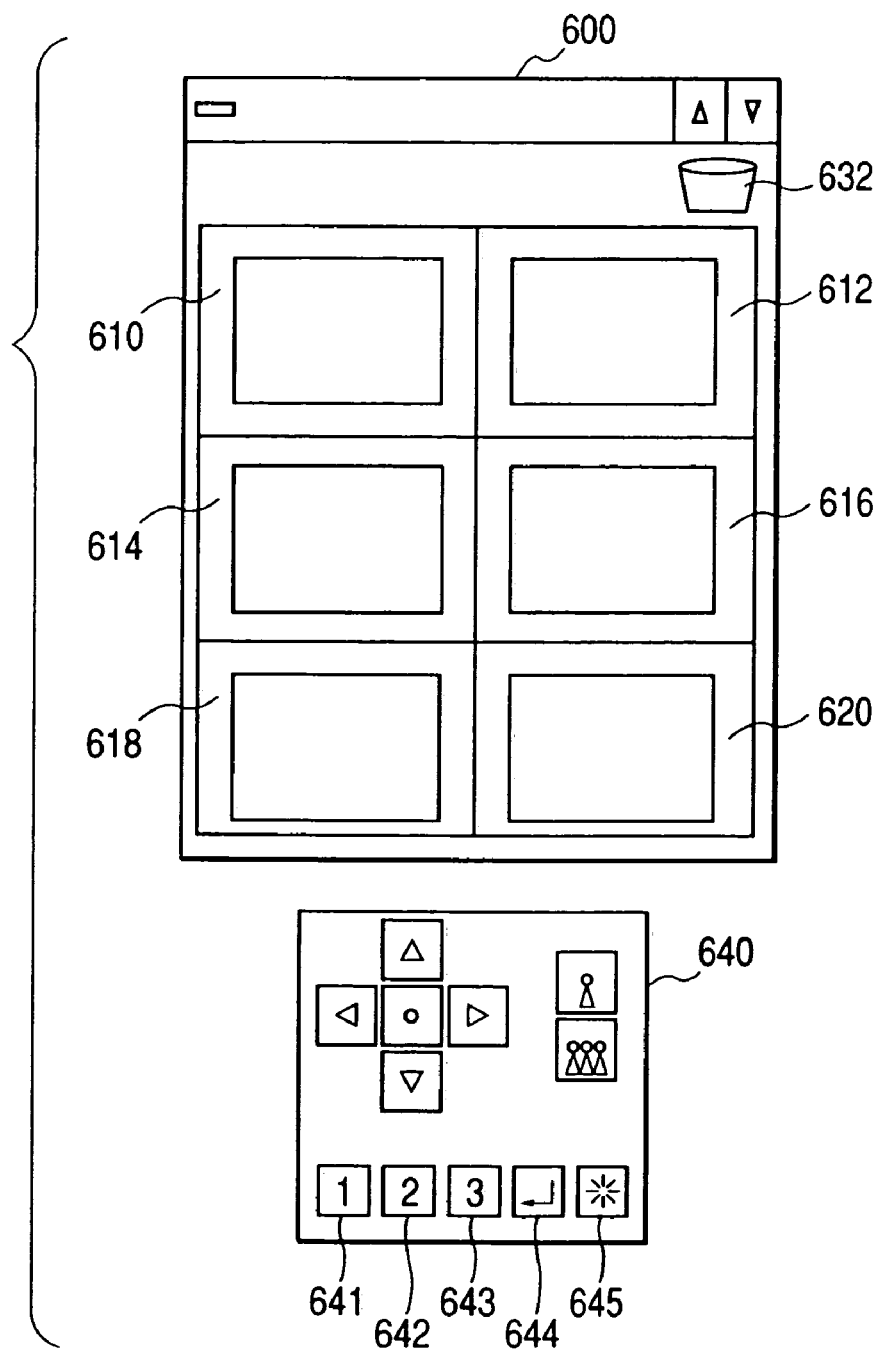
FIG. 5 is a view showing a display example of a window for displaying video from a video camera, according to one embodiment of the present invention.

FIG. 5 is a view showing a display example of a window for displaying the video (or the image) from the video camera, according to one embodiment of the present invention. As shown in FIG. 5, in a window 600, the videos taken by the plural video cameras 10 are displayed on plural video display areas 610, 612, 614, 616, 618 and 620 respectively. In the present embodiment, although six areas are shown as an example, it is not limited to this example. Also, the areas may be displayed on the same screen as that of the window shown in FIG. 3 or 4. Numeral 632 denotes a trash can icon which is used to delete the displayed video from the video display area.

Numeral 640 denotes a video camera control panel which includes camera control buttons for the video camera 10. It is possible by handling these buttons to control the panning, tilting, zooming, focusing and irising operations of the video camera 10, record and delete the preset information, and transmit the preset information to the video camera.

Numerals 641, 642 and 643 denote preset information buttons for performing operations to the preset information of the video camera being operated. An operation by each button corresponds to one preset information and one preset symbol.

Buttons 644 and 645 are used together with the buttons 641 to 643. The button 644 is used to give an instruction of storing the preset information and the button 645 is used to give an instruction of deleting the preset information.

In the present embodiment, three preset information can be stored into the one video camera. However, if means for specifying the preset information can be more prepared by increasing the buttons, it is not limited to the above case. Further, it may be structured that the map is changed every click on the tab and the registered preset information can be instructed by the buttons 641 to 643 corresponding to the clicked map. According to this structure, the number of the preset information to be controlled can be increased without changing the number of buttons.

Next, the graphical user interface (GUI) of the video communication system according to the present embodiment will be explained with reference to FIGS. 6, 7, 8, 9 and 10. In the present embodiment, if the camera icon on the map 520, 530 or the like is dragged and dropped (i.e., a drag-and-drop operation) onto the arbitrary video display area within the video display window, the motion video transmitted from the video camera corresponding to the dragged and dropped icon is displayed on the video display area onto which the camera icon is dropped.

Figure 6:
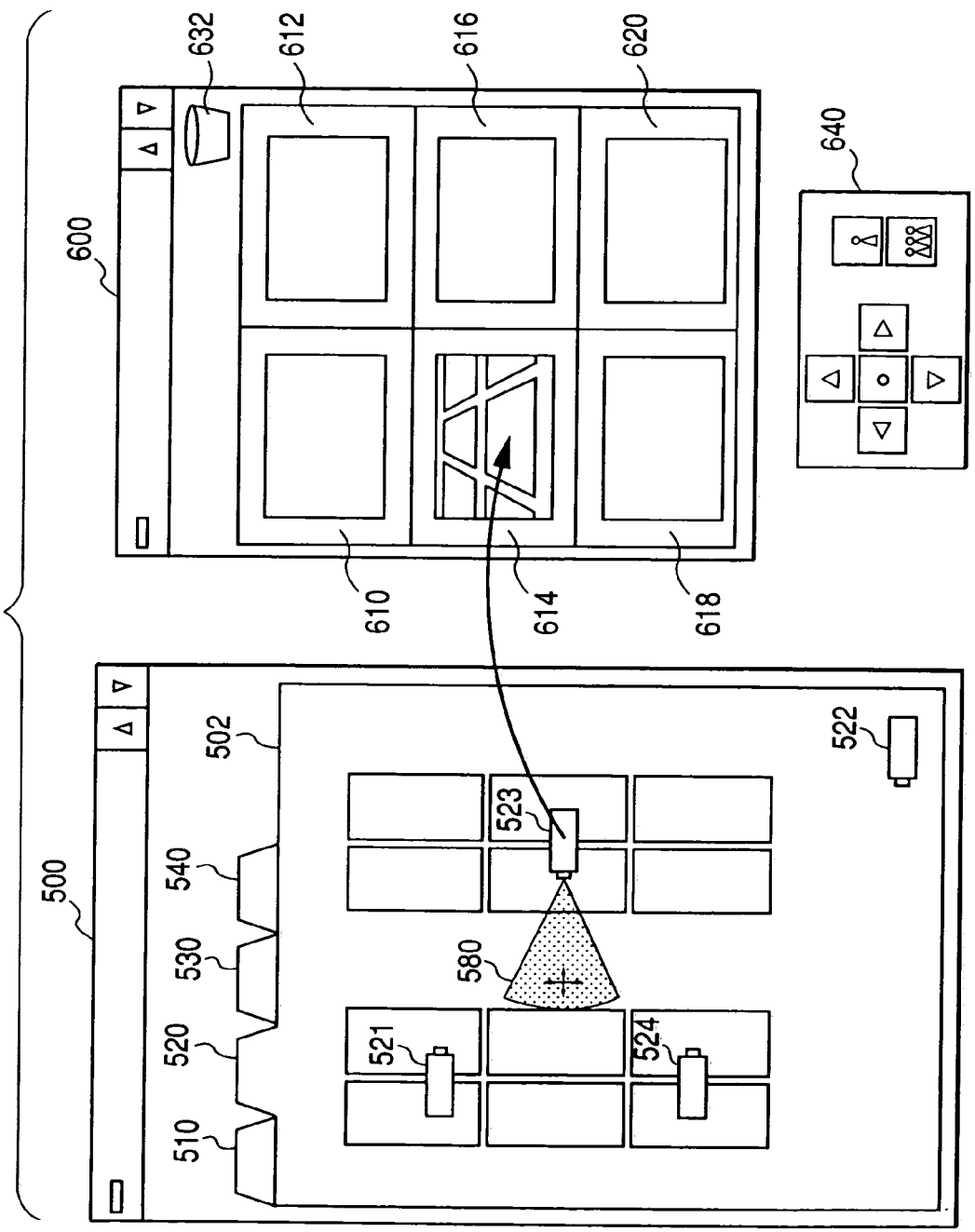
FIG. 6 is a view showing the state when display is performed by a drag-and-drop operation, according to one embodiment of the present invention.
Figure 7:
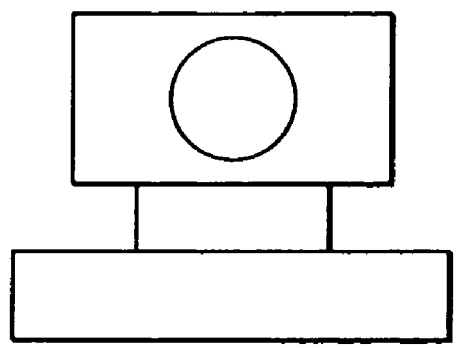
FIG. 7 is a view showing a mouse cursor of a video camera used in the drag-and drop operation according to one embodiment of the present invention.
Figure 9:
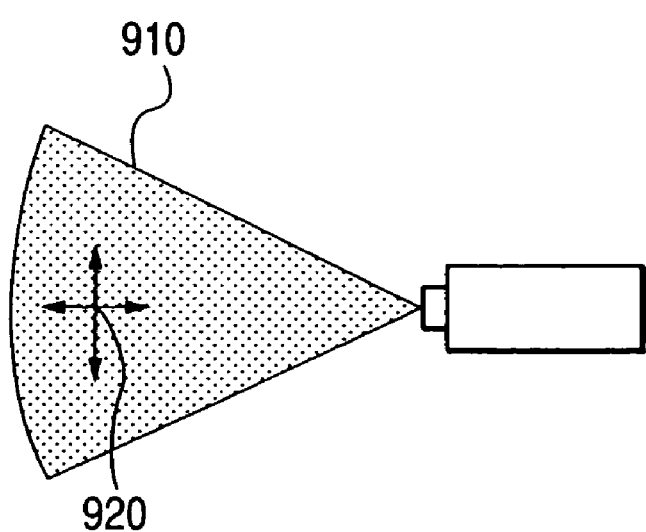
FIG. 9 is a view showing a camera icon representing that taken video is being displayed, according to one embodiment of the present invention.

FIG. 6 is the view showing the state when the display is performed by the drag-and-drop operation, according to one embodiment of the present invention. Concretely, FIG. 6 shows the state that video camera icon 523 is dragged and dropped onto the video display area 614. FIG. 7 is the view showing the mouse cursor of the video camera used in the drag-and-drop operation according to one embodiment of the present invention. FIG. 8 is the view showing the state when the display area by the drag-and-drop operation is changed, according to one embodiment of the present invention. FIG. 9 is the view showing the camera icon representing that the taken video is being displayed, according to one embodiment of the present invention. FIG. 10 is the view showing the state of the operation to stop the display by the drag-and-drop operation according to one embodiment of the present invention.

In the present embodiment, during the drag-and-drop operation, the shape of the mouse cursor is represented as a camera shown in FIG. 7, whereby the user can confirm that the drag-and-drop operation is being performed. At this time, on the basis of the location information of the dragged camera, the map management software 413 searches for the ID number of the camera concerned, and notifies the video reception software 412 of the ID of the dragged and dropped camera. On the basis of the notified ID, the video reception software 412 searches for the panning and tilting of the camera, the camera name and the name of the host computer to which the camera is connected, and notifies the camera control client software 411 and the map management software 413 of such information.

The camera control client software 411 communicates with the camera control server software 421 of the video transmitter 20 to which the video camera 10 is connected, through the network 100 in accordance with the notified information. Hereafter, the operation of the video camera 10 connected to the video transmitter 20 is controlled between the camera control client software 411 of the monitor 60 and the camera control server software 421 of the video transmitter 20 connected. The information concerning the panning operation, the tilting operation and the like of the camera is notified from the camera control client software 411 to the video reception software 412 for a predetermined time.

The video reception software 412 notifies information of the camera (panning, tilting, imaging or the like) to the map management software 413 for a predetermined time. The map management software 413 changes the displaying state of the camera icon (panning and tilting) corresponding to the camera on the map based on the notified information, displays the preset symbol and deletes the preset symbol.

The camera control client software 411 also manages the preset information.

Storage of the preset information, storage of a position of the preset symbol, transmission of the preset information to the camera and deletion of the preset information will be explained with reference to FIGS. 12, 13, 14 and 15.

Figure 12:
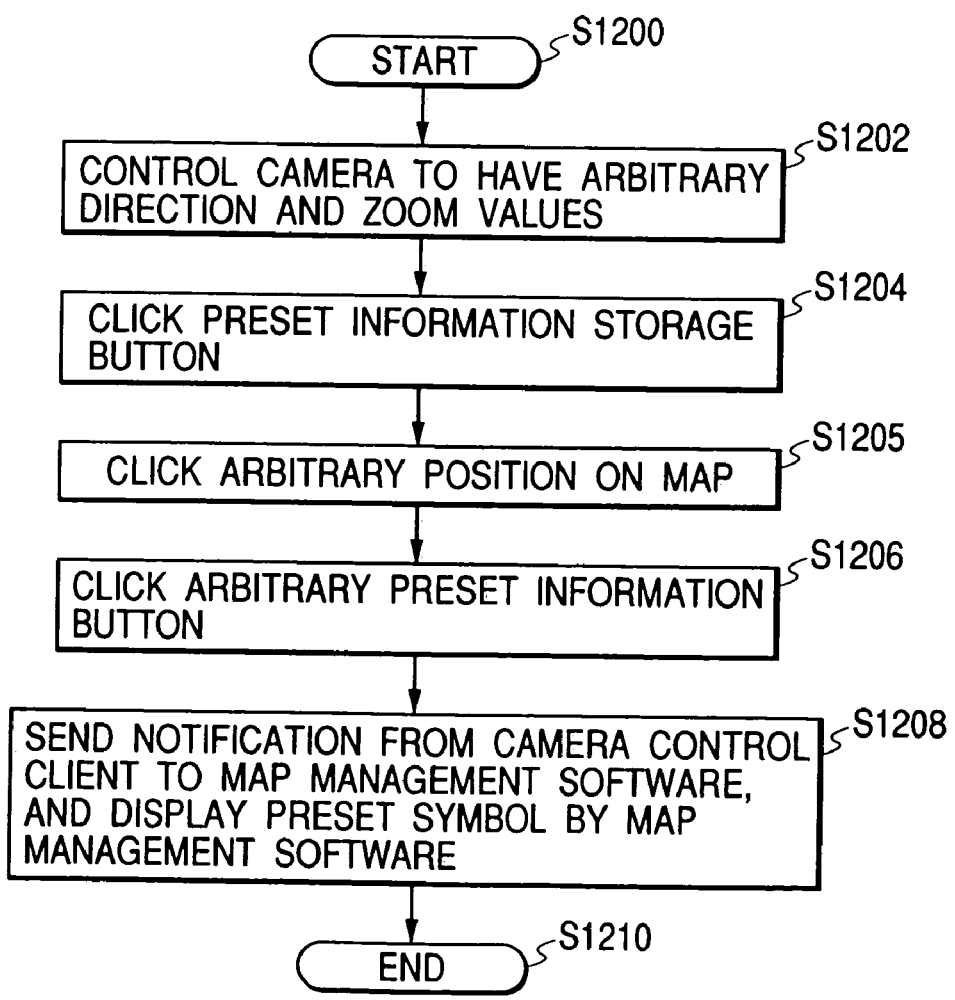
FIG. 12 is a flow chart showing an operation performed by a user when preset information is to be stored, in a certain monitor, according to one embodiment of the present invention.

FIG. 12 is a flow chart showing a storage procedure of the preset information. The preset information is recorded as follows. That is, initially, the preset information storage button 644 is clicked by the mouse (step S1204) after operating the imaging apparatus to have panning, tilting and zooming values desired to be stored as the preset information (step S1202). Next, a desired position of displaying the preset symbol is designated by clicking that position on the map by the mouse (step S1205). Then, an arbitrary preset information button among the buttons 641 to 643 is clicked by the mouse (step S1206). As above, the preset information and the position of the preset symbol relative to the preset information buttons are stored (step S1208).

The camera control client software 411 sends a notification to the map management software 413 when the preset information is stored. On the basis of this notified instruction, the map management software synthetically displays the preset symbol corresponding to the preset information button onto the stored position on the map.

Figure 13:
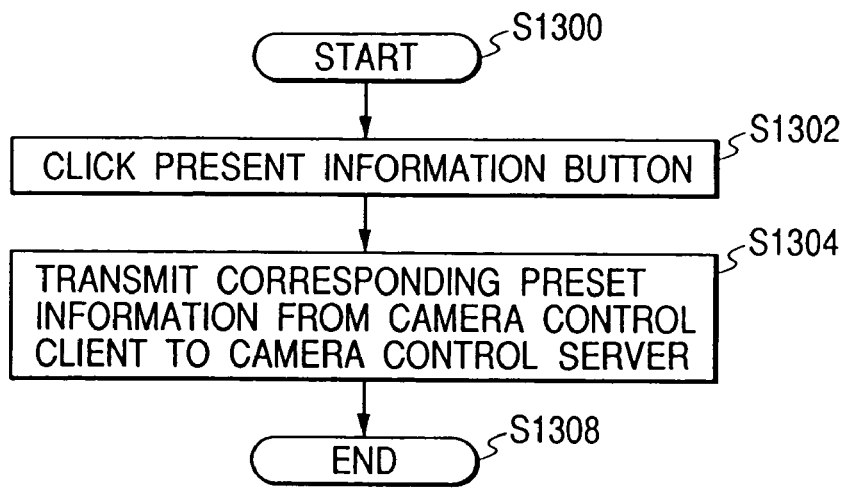
FIG. 13 is a flow chart showing an operation performed by the user when the preset information is transmitted to a video camera, in a certain monitor, according to one embodiment of the present invention.

As referred to FIG. 13, the preset information can be transmitted to the camera as follows.

When the preset information buttons 641 to 643 are clicked by the mouse (step S1302) in a state of being selected the camera icon corresponding to the imaging apparatus which is displaying video upon being performed a displaying operation, the correspondingly stored preset information is sent from the camera control client software 411 to the camera control server software 421 (step S1304).

In this state, the same effect can be obtained by an operation of directly clicking the camera symbol by the mouse without clicking the preset information buttons 641 to 643. Hereinafter, a transmission procedure for transmitting the preset information to the camera by clicking the preset symbol by the mouse will be explained with reference to FIG. 15.

When the map is clicked by the mouse (step S1502), the map management software 413 checks whether or not there is the preset symbol onto a clicked position (step S1504). If there is, it is checked whether or not the imaging apparatus relative to the preset symbol is imaging the video (step S1506). When the imaging apparatus is imaging the video, an instruction of transmitting the preset information corresponding to the preset symbol is notified to the camera control client software 412. Then, the camera control client software 412 sends the preset information to the camera control server software (step S1508).

In the present embodiment, the number of the preset symbol is to be corresponded to the serial number of the preset information buttons on the camera control panel.

Figure 14:
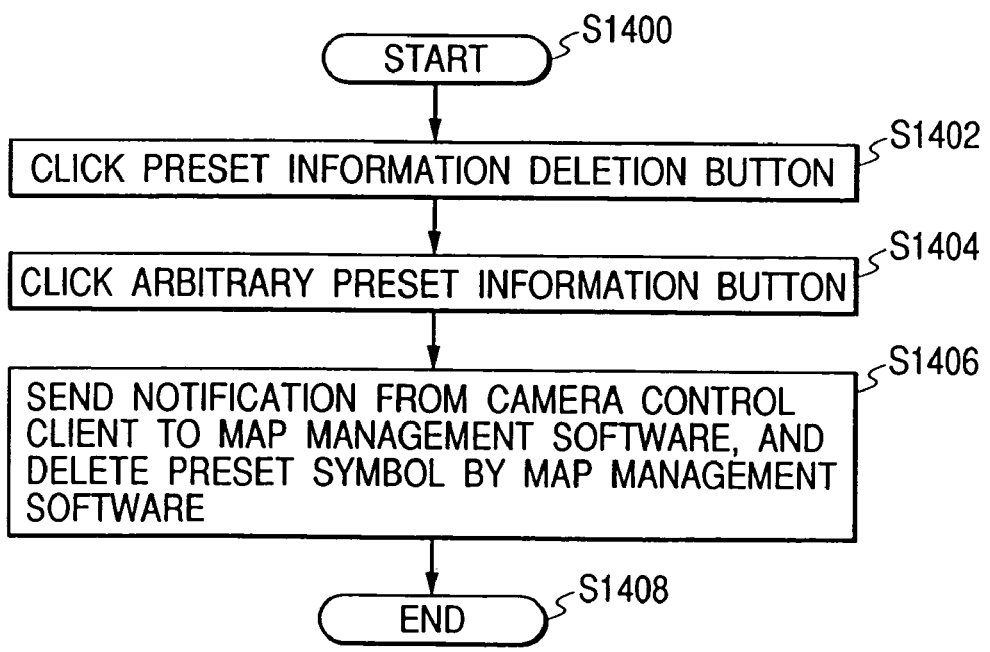
FIG. 14 is a flow chart showing an operation performed by the user when the preset information is to be deleted, in a certain monitor, according to one embodiment of the present invention.
Figure 15:
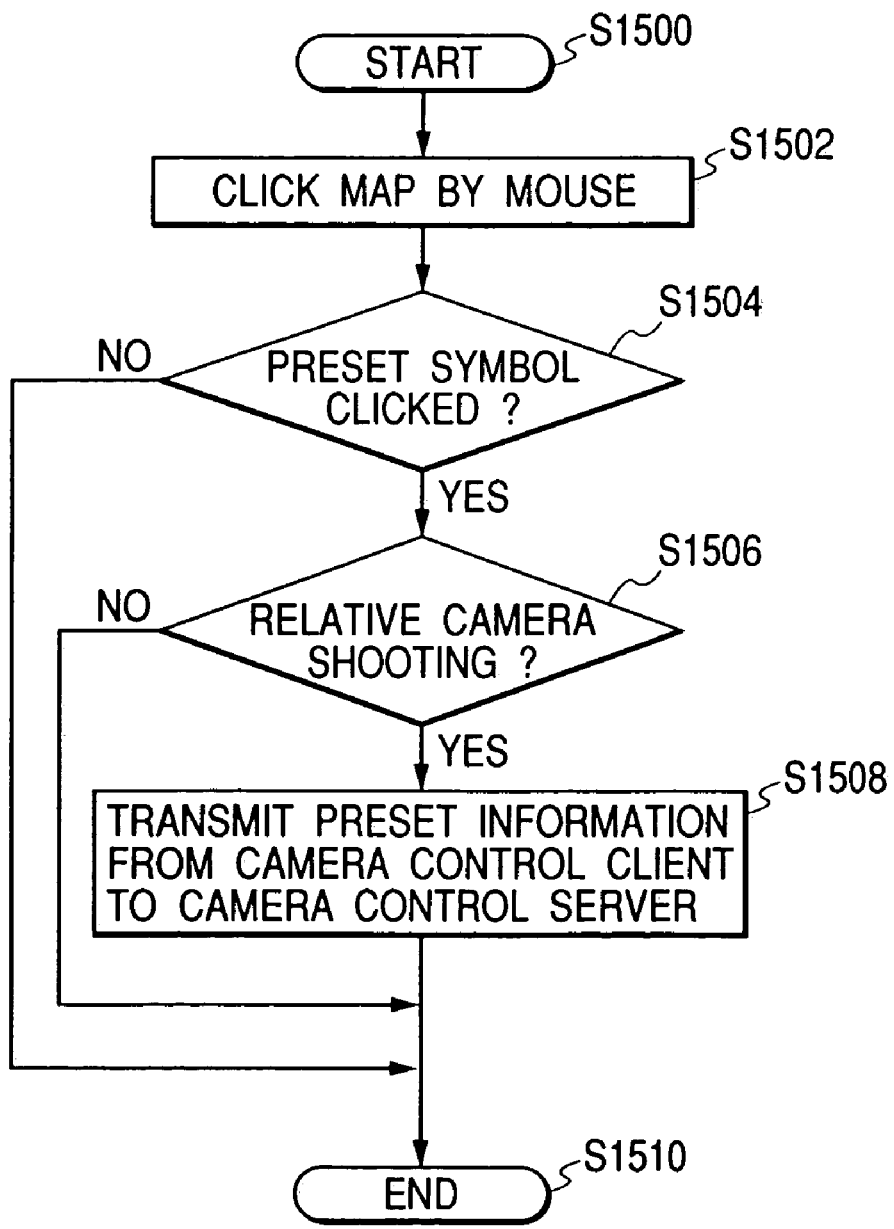
FIG. 15 is a flow chart showing an operation performed by the user when the preset information is transmitted to the video camera, in a certain monitor, according to one embodiment of the present invention.

FIG. 14 is a flow chart showing a deletion procedure of the preset information. The preset information deletion button 645 is clicked by the mouse (step S1402), and the preset information button to be desired to delete the preset information is clicked by the mouse (step S1404). Then, the preset information relative to the clicked preset information button can be deleted (step S1406).

When the preset information is deleted, the camera control client software 411 sends the notification to the map management software 413. On the basis of the notified instruction, the map management software deletes the preset symbol corresponding to the preset information deleted from the map.

In case of setting the preset information, an imaging video of whole area which can be taken by the video camera 10 (a sector area AOB in FIG. 4) is to be displayed on the bit map display 135. The operator sets the preset information with use of the mouse 128 while observing the video.

Concretely, the operator instructs a desired position on the display of the above whole area. Accordingly, information of the desired position is sent to the video camera 10 through the network 100 and the video transmitter.

In accordance with this position information, the video camera performs the panning and the tilting operations and takes video including the instructed position to send it back to the monitor 60.

The operator instructs direction (panning and tilting) and zooming of the camera through operations at the video camera control panel shown in FIG. 5, while confirming the bit map display 135 on which the video is displayed. When the video camera maintains a state desired by the operator upon confirming the taken video which is continuously changed according to the instruction, the preset information (panning, tilting, zooming and irising values at that time) is set by the operator to click the above preset information storage button by the mouse.

As above, the operator can intuitively grasp the preset positional relationship of the imaging object by displaying the preset symbol on an arbitrary position desired by the operator.

Since the imaging apparatus can be controlled on the basis of the corresponding preset information by clicking the preset symbol by the mouse, not only it becomes possible to easily control the imaging apparatus using only the map, but also it becomes possible to quickly turn a face of the imaging apparatus to the direction of the imaging object.

The operator can give a title from the keyboard 130 according to the preset information which was set as above. This title is stored into the storage unit 126 of the monitor 60 or the external memory 125, corresponding to the preset information.

The title corresponding to the preset information (position) is displayed when an instruction image (arrow mark) of the mouse 128 is moved onto the preset symbol. When the instruction image (arrow mark) of the mouse 128 is moved onto the camera symbol 531 shown in FIG. 4, a preset display button which was set to the video camera of the symbol 531 may be displayed. In a case where the map is not complex, the title may always be displayed. The above process is also executed under the control of the camera control client software 411 after the process in the step S1206 shown in FIG. 12. In this way, by giving the title corresponding to the preset information (position), it becomes possible to understand why the operator sets the preset information, in a few days.

According to the above display of the preset symbol, the operator can grasp the positional relationship of the imaging object which was preset.

The map management software 413 updates the map stored in the video board 136, thereby changing the direction of the camera icon according to the direction of the actual video camera 10, drawing a scope 910 (FIG. 9) representing that the video (or the image) taken by the video camera 10 concerned is being displayed, and drawing a control pointer 920 (FIG. 9) to control the panning, tilting and zooming operations of the camera, the preset symbols, for example, 531-1, 531-2 and the like within the scope 910.

Further, the information concerning the panning operation, the tilting operation and the like of the camera is notified from the video reception software 412 to the map management software 413 for a predetermined time. Thus, if the panning state, the tilting state, the zooming state and the like of the camera, and the presence or absence state of the preset information are changed on the camera control panel 640, such the changes are reflected on the displaying states of the camera icons 521, 522, 523, 524 and the like, and the preset symbols 531-1, 531-2 and the like.

The actual image data is transmitted from the video transmitter 20 in accordance with the request from the video reception software 412 of the monitor 60. The video reception software 412 transmits a command to the video transmission software 422 of the video transmitter 20 to which the video camera 10 concerned is connected, through the network 100. This command is to request data transmission of one frame. The video transmission software 422 receives the command, divides the captured latest frame data into packets, and then transmits these packets to the video reception software 412. The video reception software 412 restructures the image frame from the received packets, displays the restructured image frame on the video display area, and again transmits the video transmission request command. By repeating such operations at high speed, the video at the remote location is transmitted and displayed through the network 100. Thus, the video taken by the video camera 10 remotely located is displayed on the bit map display 135 of the monitor 60.

When the videos taken by the plural video cameras 10 are displayed on the screens, the video transmission request command is issued, the captured video is compressed, the frame is divided into the packets, the divided packets are transmitted to the network, the packets are received, the frame is restructured, the compressed data is decompressed, and the decompressed video data is displayed in turn and repeatedly, for each of the video transmission software of the video transmitter 20 to which each camera is connected.

The video taken by the video camera can be shifted by dragging and dropping the displayed video to the desired video display area as shown in FIG. 8. FIG. 8 shows the state that the video taken by the video camera icon 523 displayed on the video display area 614 is shifted to the video display area 612. At this time, the video reception software 412 clears the area 614, and changes internal parameters such that the area 612 (i.e., the drag-and-drop destination) acts as the video display area of the video of the camera 10. Hereafter, the video taken by the video camera 10 concerned is displayed on the drag-and-drop destination. It should be noted that the logical network is not disconnected even by such the operation. Namely, as described later, the once-connected communication network is not disconnected until the video display area displaying the video is dragged and dropped into the trash can icon.

The display of the video taken by the video camera 10 is stopped as shown in FIG. 10. Namely, the video display area on which the video intended to be deleted is being displayed is dragged and dropped into the trash can icon 632 within the video display window. FIG. 10 shows the state after the display of the video of the video camera icon 523 on the video display area 614 is stopped. At this time, the video reception software 412 clears the area 614 to stop issuing the video transmission request command to the software 412 of the video transmitter 20 connected till then. Further, the video reception software 412 notifies the camera control client software 411 and the map management software 413 of the fact that the display was stopped.

The camera control client software 411 receives such the notification, disconnects the network to the video transmitter 20 connected, and clears the corresponding video display area. Further, the map management software 413 eliminates the scope display from the icon 523 of the video camera 5 concerned, and updates the map.

As other embodiments, the present invention is applicable to a system composed of plural equipments (e.g., a host computer, an interface equipment, a reader, a printer and the like) or to an apparatus including a single equipment (e.g., a copying machine, a facsimile machine or the like).

It is needless to say that the object of the present invention can be achieved in a case where a storage medium storing the program codes of a software for realizing the functions of the above-described embodiments is supplied to a system or an apparatus and then a computer (or CPU or MPU) in the system or the apparatus reads and executes the program codes stored in the memory medium.

In this case, the program codes themselves read from the storage medium realize the functions of the embodiments, and the storage medium storing such the program codes constitute the present invention.

The storage medium for supplying the program codes can be, for example, a floppy disk, a hard disk, an optical disk, a magnetooptical disk, a CD-ROM, a CD-R, a magnetic tape, a non-volatile memory card, a ROM, or the like.

It is needless to say that the present invention also includes not only the case where the functions of the embodiments are realized by the execution of the program codes read by the computer, but also a case where an OS (operating system) or the like functioning on the computer executes all the process or a part thereof according to the instructions of the program codes, thereby realizing the functions of the embodiments.

Further, it is needless to say that the present invention further includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of such program codes, thereby realizing the functions of the embodiments.

According to the present invention, the state of the imaging apparatus such as the direction of the imaging apparatus and the like according to the stored control information can be easily grasped. Also, the relationship among the plural control information can be easily grasped.

Image data which is changing is to be displayed on the display device by controlling the imaging apparatus. The storage means stores as the control information the state of the imaging apparatus when an instruction was given by an instruction device. Accordingly, it becomes possible to store the control information after confirming that how the video is taken by the imaging apparatus.

It becomes possible to easily speculate that the control information was what kind of information and to provide the control information with a state of not confusing a user visually. Further, the control information can be easily deleted.

In a case where a position of the preset symbol is fixed and the map is not very precise, there sometimes occurs such the situation that an object image does not exist in the direction of the camera symbol. However, since the preset symbol can be put on an arbitrary position, positioning between the preset symbol and the object image can be performed without reforming the map precisely.

Further, the imaging apparatus can be easily and intuitively controlled without redundancy by providing an operation means for the preset symbol on the map.

What is claimed is:

1. A communication apparatus which receives image data taken by an imaging apparatus connected through a network, comprising:
a storage unit for storing preset parameter information to control at least one operation of panning, tilting, zooming and irising of said imaging apparatus;
a first output unit for outputting to a display unit a first synthetic map image which is obtained by synthesizing a camera symbol indicating a setting location of said imaging apparatus on a map image;
a selection unit for selecting an imaging apparatus to be controlled in accordance with designating the camera symbol corresponding to the imaging apparatus on the first synthetic map image;
a second output unit for outputting to a display unit a second synthetic map image which is obtained by synthesizing a first symbol corresponding to the preset parameter information of the selected imaging apparatus stored in said storage unit on the first synthetic map image, and a second symbol corresponding to the preset parameter information of the selected imaging apparatus stored in said storage unit which has same identifying information of preset parameter as an identifying information of preset parameter of the first symbol on a different area from the map after an imaging apparatus is selected by said selection unit;
an instruction unit for permitting said user to instruct selectively the first symbol on the map and the second symbol on the different area which have same identifying information of preset parameter, displayed by said display unit;
a transmit unit for transmitting the preset parameter information to control at least one operation of panning, tilting, zooming, and irising of said imaging apparatus stored by said storage unit to the imaging apparatus in response to an instruction of at least one of the first symbol and the second symbol on the map by said instruction unit.

2. An apparatus according to claim 1, wherein there are the plural reset parameter information stored by said storage unit, and the plural first symbols corresponding to the plural control information are synthesized on the first synthetic map image.

3. An apparatus according to claim 1, wherein the image data changed by controlling said imaging apparatus is displayed on said display unit, and said storage unit stores as the control information the operation state of said imaging apparatus when an instruction was given by said instruction device.

4. An apparatus according to claim 3, wherein there are said plural imaging apparatuses, and the control information can be instructed to each of said imaging apparatuses.

5. An apparatus according to claim 1, wherein said storage unit stores a title corresponding to the control information.

6. An apparatus according to claim 5, wherein said output unit also outputs the title to said display unit.

7. An apparatus according to claim 6, wherein the tide is output according as an instruction image of an instruction device is moved onto the first symbol.

8. An apparatus according to claim 1, wherein the control information is deleted according to a deletion instruction from an instruction device.

9. An apparatus according to claim 1, wherein a synthesizing position can be arbitrarily designated when the first symbol is synthesized to the first synthetic map image.

10. An apparatus according to claim 1, wherein said storage unit stores a synthesizing position corresponding to the control information.

11. A control method of a communication apparatus which receives image data taken by an imaging apparatus connected through a network, comprising the steps of:
- storing control information to control at least one operation of panning, tilting, zooming, and irising of the imaging apparatus;
- outputting to a display unit a first synthetic map image which is obtained by synthesizing a camera symbol indicating a setting location of said imaging apparatus on a map image;
- selecting an imaging apparatus to be controlled in accordance with designating the camera symbol corresponding to the imaging apparatus on the first synthetic map image;
- outputting to a display unit a second synthetic map image which is obtained by synthesizing a first symbol corresponding to the preset parameter information of the selected imaging apparatus stored in said storage step on the first synthetic map image, and a second symbol corresponding to the preset parameter information of the selected imaging apparatus stored in said storage step which has same identifying information of preset parameter as an identifying information of preset parameter of the first symbol on a different area from the map after an imaging apparatus is selected by said selecting step;
- utilizing an instruction unit for permitting said user to instruct selectively the first symbol on the map and the second symbol on the different area which have same identifying information of preset parameter, displayed by said display unit; and
- transmitting the preset parameter information to control at least one operation of panning, tilting, zooming, and irising of said imaging apparatus stored in said storage step to the imaging apparatus in response to an instruction of at least one of the first symbol and the second symbol on the map by said unit.

12. A storage medium which stores a program to be executed by a computer for controlling an imaging apparatus in a communication apparatus which receives image data taken by the imaging apparatus connected through a network, said program comprising:
- a code of storing control information to control at least one operation of panning, tilting, zooming, and irising of the imaging apparatus;
- a code of outputting to a display unit a first synthetic map image which is obtained by synthesizing a camera symbol indicating a setting location of said imaging apparatus on a map image;
- a code of selecting an imaging apparatus to be controlled in accordance with designating the camera symbol corresponding to the imaging apparatus on the first synthetic map image;
- a code of outputting to a display unit a second synthetic map image which is obtained by synthesizing a first symbol corresponding to the preset parameter information of the selected imaging apparatus stored in said storage step on the first synthetic map image, and a second symbol corresponding to the preset parameter information of the selected imaging apparatus stored in said storage step which has same identifying information of preset parameter as an identifying information of preset parameter of the first symbol on a different area from the map after an imaging apparatus is selected by said selecting step;
- a code of utilizing an instruction unit for permitting said user to instruct selectively the first symbol on the map and the second symbol on the different area which have same identifying information of preset parameter, displayed by said display unit; and
- a code of transmitting the preset parameter information to control at least one operation of panning, tilting, zooming, and irising of said imaging apparatus stored by said storage code to the imaging apparatus in response to an instruction of at least one of the first symbol and the second symbol on the map by said instruction unit.

* * * * *